(12) United States Patent
Zheng et al.

(10) Patent No.: US 9,931,596 B2
(45) Date of Patent: Apr. 3, 2018

(54) EMISSIONS TREATMENT SYSTEMS WITH TWC CATALYSTS AND SCR-HCT CATALYSTS

(71) Applicant: BASF CORPORATION, Florham Park, NJ (US)

(72) Inventors: Xiaolai Zheng, Princeton Junction, NJ (US); Chunxin Ji, Hillsborough, NJ (US); Wen-Mei Xue, Dayton, NJ (US); Matthew J. Schladt, Princeton Junction, NJ (US); Xiaoming Wang, Springfield, NJ (US); Tian Luo, Piscataway, NJ (US); Michel Deeba, East Brunswick, NJ (US); Knut Wassermann, Princeton, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 15/503,903

(22) PCT Filed: Oct. 21, 2015

(86) PCT No.: PCT/US2015/056708
§ 371 (c)(1),
(2) Date: Feb. 14, 2017

(87) PCT Pub. No.: WO2016/065034
PCT Pub. Date: Apr. 28, 2016

(65) Prior Publication Data
US 2017/0274321 A1    Sep. 28, 2017

Related U.S. Application Data

(60) Provisional application No. 62/066,509, filed on Oct. 21, 2014.

(51) Int. Cl.
| | |
|---|---|
| *B01D 53/94* | (2006.01) |
| *F01N 3/20* | (2006.01) |
| *B01J 23/56* | (2006.01) |
| *B01J 29/70* | (2006.01) |
| *B01J 29/76* | (2006.01) |

(52) U.S. Cl.
CPC ....... *B01D 53/945* (2013.01); *B01D 53/9418* (2013.01); *B01J 23/56* (2013.01); *B01J 29/7007* (2013.01); *B01J 29/763* (2013.01)

(58) Field of Classification Search
CPC .............. B01D 53/945; B01D 53/9418; B01D 53/9445; B01D 53/9486; B01D 53/94; F01N 3/101; F01N 3/103; F01N 3/20; F01N 3/2066; F01N 3/2073; F01N 3/2882; F01N 2250/00; F01N 2570/14
See application file for complete search history.

(56) References Cited

U.S. PATENT DOCUMENTS

| | | | |
|---|---|---|---|
| 6,109,024 A | 8/2000 | Kinugasa et al. | |
| 8,769,934 B2 | 7/2014 | Sakurai | |
| 2007/0012032 A1* | 1/2007 | Hu | B01D 53/9418 60/286 |
| 2010/0251700 A1 | 10/2010 | Wan et al. | |
| 2011/0023855 A1 | 2/2011 | Van Nieuwstadt et al. | |
| 2013/0243659 A1 | 9/2013 | Sutton et al. | |

OTHER PUBLICATIONS

International Search Report dated Jan. 28, 2016.
Written Opinion dated Jan. 28, 2016.

* cited by examiner

*Primary Examiner* — Timothy C Vanoy
(74) *Attorney, Agent, or Firm* — Womble Bond Dickinson (US) LLP (57) ABSTRACT

An emissions treatment system for an exhaust stream of an internal combustion engine including hydrocarbons, carbon monoxide, and nitrogen oxides is provided. The disclosed system can include an exhaust conduit in fluid communication with the internal combustion engine via an exhaust manifold; a first three-way conversion catalyst (TWC-1) located downstream of the internal combustion engine in the exhaust conduit; an SCR-HCT catalyst comprising a selective catalytic reduction catalyst and a hydrocarbon trap downstream of the TWC-1 in the exhaust conduit; and a third catalyst downstream of the SCR-HCT combination in the exhaust conduit, the third catalyst comprising a platinum group metal (PGM) e.g., in an amount effective to oxidize hydrocarbons. Methods of making and using such systems and components thereof are also provided.

25 Claims, 6 Drawing Sheets

EMISSIONS TREATMENT SYSTEMS WITH TWC CATALYSTS AND SCR-HCT CATALYSTS

This is a National Phase Application filed under 35 U.S.C. 371 of International Application No. PCT/US2015/056708 filed Oct. 21, 2015, the entire contents is hereby incorporated herein by reference in its entirety.

FIELD OF THE INVENTION

The present invention is directed to emissions treatment systems using exhaust gas purifying catalysts, and particularly to combinations of such catalysts having different functions and methods of use.

BACKGROUND OF THE INVENTION

Stringent emission regulations on light-duty gasoline vehicles such as US LEV III and EURO 7 demand advanced three-way conversion (TWC) catalyst systems. By 2025, for instance, super ultra-low emission vehicles (SULEV) are projected to have a substantial market share in North America, requiring combined non-methane hydrocarbon (NMHC) and NOx emissions of less than 30 mg/mile under warranty of 15 years and 150K miles on a fleet average.

It is generally recognized that TWC catalyst systems generate ammonia. U.S. Pat. No. 6,109,024 to Kinugasa et al. describes an exhaust gas purification device for an internal combustion engine that locates both an ammonia adsorbing-denitrating catalyst and a NOx adsorbing-reducing catalyst downstream of a TWC catalyst. U.S. Pat. No. 8,661,788 to Qi et al. describes a system that positions an ammonia-SCR catalyst downstream of a TWC catalyst.

For the purpose of reducing tailpipe hydrocarbon (HC) emissions, HC adsorbent components (typically one or more microporous zeolite based materials) have been proposed to delay HC release, in particular, during engine cold start. U.S. Pat. No. 7,163,661 to Yamamoto et al. contemplates addressing release of cold start hydrocarbons (HCs) using an emissions treatment system comprising an HC adsorbing/purifying catalyst downstream of a first three-way catalyst and a second three-way catalyst downstream of the HC adsorbing/purifying catalyst.

There is a need to develop high performance TWC systems meeting the tightening emission standards. In particular, there is an ongoing need to reduce both HC breakthrough during cold start and NOx breakthrough at hot stage.

SUMMARY OF THE INVENTION

The present disclosure generally provides catalyst articles and catalyst systems comprising such catalyst articles. In particular, such articles and systems comprise a SCR-HCT catalyst, which is a combination of a selective catalytic reduction (SCR) catalyst with a hydrocarbon trap (HCT), preferably formed on a single monolithic substrate. The SCR-HCT catalyst, in some embodiments, is used in conjunction with one or more additional types of catalysts. For example, such additional catalysts can include platinum group metal (PGM)-containing catalysts, providing a system capable of reducing both HC breakthrough during cold start and NOx breakthrough at hot stage.

One aspect provides an emissions treatment system for an exhaust stream of an internal combustion engine, the exhaust stream comprising hydrocarbons, carbon monoxide, and nitrogen oxides, the emission treatment system comprising: an exhaust conduit in fluid communication with the internal combustion engine via an exhaust manifold; a first three-way conversion catalyst (TWC-1) located downstream of the internal combustion engine in the exhaust conduit; an SCR-HCT catalyst comprising a selective catalytic reduction (SCR) catalyst and a hydrocarbon trap (HCT) downstream of the TWC-1 in the exhaust conduit; and a third catalyst downstream of the SCR-HCT catalyst in the exhaust conduit, the third catalyst comprising a platinum group metal (PGM). The PGM is, in certain embodiments, present in an amount effective to oxidize hydrocarbons.

The SCR-HCT catalyst may, in some embodiments, comprise an SCR catalytic material that comprises a first molecular sieve and an HCT material comprises a second molecular sieve that is different from the first molecular sieve, wherein both the SCR catalytic material and the HCT material are deposited on a monolithic substrate. In certain embodiments, the first molecular sieve may comprise a Cu-CHA zeolite and the second molecular sieve may comprise a Beta zeolite. The SCR catalytic material and the HCT material, in some embodiments, are present in a weight ratio of 10:1 to 1:10. The monolithic substrate may be, for example, a flow-through substrate or a wall-flow filter.

The first molecular sieve may comprise an 8-member ring small pore zeolite containing a metal promoter and the second molecular sieve may comprise a 10-member ring medium pore or a 12-member ring large pore zeolite. In certain embodiments, the 10-member ring medium pore or 12-member ring large pore zeolite comprises a metal promoter. The 8-member ring zeolite may, in some embodiments, be ion-exchanged with one or more of copper and iron, having a CHA, SAPO, or AEI structure. The 10- or 12-member ring zeolite can, in certain embodiments, comprise the metal promoter have a structure type of ZSM-5, Beta, or MFI in a $H^+$, $NH^{4+}$, Cu-exchanged, or Fe-exchanged form.

The HCT material and the SCR catalytic material may be, for example, in a homogenously mixed layer on the monolithic substrate, in a layered configuration on the monolithic substrate, or in a zoned configuration on the monolithic substrate.

The third catalyst may, in various embodiments, be selected from the group consisting of: a second three-way conversion (TWC-2) catalyst, an oxidation catalyst (OC), or a lean NOx trap (LNT). The third catalyst may be heated by an external source. The third catalyst may comprise a carrier having a smaller thermal mass relative to carriers for the TWC-1. Thermal mass describes the ability of a material to absorb and store heat. In certain such embodiments, both the third catalyst and the TWC-1 are associated with a carrier (e.g., a monolith substrate) and a lower thermal mass carrier for the third catalyst can provide for a quicker response to temperature changes (e.g., in facilitation of light-off of released HCs).

In certain embodiments, the TWC-1 may be located in a close-coupled position; and the SCR-HCT catalyst and the third catalyst may be located in an underfloor position. In some embodiments, the TWC-1, the SCR-HCT catalyst, and the third catalyst may all be located in one module. In some embodiments, the SCR-HCT catalyst and the third catalyst may both be located in one module. The emissions treatment system can optionally further comprise an air supply upstream of the SCR-HCT catalyst.

Another aspect provides an emissions treatment system for an exhaust stream of an internal combustion engine, the exhaust stream comprising hydrocarbons, carbon monoxide, and nitrogen oxides, the emission treatment system comprising: an exhaust conduit in fluid communication with the internal combustion engine via an exhaust manifold; a first three-way conversion catalyst (TWC-1) located downstream of the internal combustion engine in the exhaust conduit; an SCR-HCT catalyst comprising a selective catalytic reduction (SCR) catalyst and a hydrocarbon trap (HCT) downstream of the TWC-1 in the exhaust conduit, the SCR catalyst comprising a first molecular sieve and the HCT catalyst comprising a second molecular sieve that is different from the first molecular sieve; and a second three-way conversion catalyst (TWC-2) downstream of the SCR-HCT catalyst in the exhaust conduit that comprises a platinum group metal (PGM) and an oxygen storage component. Generally, the TWC-1 is effective to produce ammonia (e.g., in an amount sufficient for use in the context of the downstream SCR catalyst. The PGM and oxygen storage component may, in some embodiments, be in a combined amount effective to oxidize hydrocarbons. The first molecular sieve may, in some embodiments, comprise an 8-member ring zeolite having a CHA, SAPO, or AEI structure that is ion-exchanged with copper or iron and the second molecular sieve may comprise a 10- or 12-member ring zeolite having a ZSM-5, Beta, or MFI in a $H^+$, $NH^{4+}$, Cu-exchanged, or Fe-exchanged form, wherein the 10- or 12-member ring zeolite is optionally ion-exchanged. In certain embodiments, the HCT and the SCR catalyst may be in a layered configuration on a monolithic substrate. The first zeolite may, in some embodiments, comprise Cu-CHA and the second zeolite may comprise a Beta zeolite.

In a further aspect, the present disclosure provides a method for treating exhaust gases, comprising contacting a gaseous stream, the method comprising contacting a gaseous stream comprising hydrocarbons (HCs), carbon monoxide (CO), and nitrogen oxides (NOx) with any of the emissions treatment systems disclosed herein. Such a gaseous stream may generally be an exhaust stream from an internal combustion engine. In various embodiments, upon contact with the TWC-1, hydrocarbons, carbon monoxide, and nitrogen oxides are substantially simultaneously converted and ammonia is generated (e.g., in an amount effective for the SCR catalyst); upon contact with the SCR-HCT catalyst, ammonia is stored in the SCR catalyst and used for reduction of breakthrough NOx, and hydrocarbons are trapped in the HCT during cold start and released at higher temperatures; and upon contact with the third catalyst, hydrocarbons released from the HCT are lit-off. When the third catalyst is a TWC-2, upon contact with the TWC-2, hydrocarbons released from the HCT are lit-off and breakthrough CO, HC, and NOx are converted.

Another aspect provided herein is a method of making an emissions treatment system, the method comprising: providing a first three-way conversion (TWC-1) catalyst located downstream of an internal combustion engine in an exhaust conduit; locating an SCR-HCT catalyst comprising a selective catalytic reduction (SCR) catalyst and a hydrocarbon trap (HCT) downstream of the TWC-1 in the exhaust conduit; and locating a third catalyst downstream of the SCR-HCT catalyst in the exhaust conduit, the third catalyst comprising a platinum group metal (PGM). The PGM can, in certain embodiments, be provided in an amount effective to oxidize hydrocarbons.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION OF THE PREFERRED EMBODIMENTS

Before describing several exemplary embodiments of the invention, it is to be understood that the invention is not limited to the details of construction or process steps set forth in the following description. The invention is capable of other embodiments and of being practiced or being carried out in various ways. Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments. The articles "a" and "an" are used herein to refer to one or to more than one (i.e., to at least one) of the grammatical object of the article. Any ranges cited herein are inclusive. The term "about" used throughout this specification is used to describe and account for small fluctuations. For example, the term "about" can refer to less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" of course includes the specific value. For instance, "about 5.0" must include 5.0.

A conventional exhaust abatement system for a stoichiometric-burn gasoline engine typically has a serial system of two TWC catalysts. A first/upstream TWC catalyst is mounted in a position near the exhaust manifold and the engine compartment (the close-coupled position, CC) and a second/downstream TWC catalyst is placed in a position either closely next to the first TWC (the second close-coupled position, CC2) or underneath the vehicle body (the underfloor position, UF). The first TWC is quickly heated up during cold start and provides the majority of conversions for pollutants including NOx, HC and CO; the second TWC supplements the catalytic conversions mainly after light-off. It is well known that, under rich conditions in the presence of an excess of residual fuel and a deficiency of air, a fraction of NOx is over-reduced on the first TWC catalyst to generate ammonia.

The present disclosure provides a SCR-HCT catalyst, which is a combination of a selective catalytic reduction (SCR) catalyst with a hydrocarbon trap (HCT). In some embodiments, the SCR-HCT catalyst can be placed downstream of a TWC catalyst and, in such embodiments, is effective in converting ammonia produced on a TWC catalyst. Various other catalysts can, in some embodiments, be used in combination with a SCR-HCT catalyst and/or TWC catalyst, as will be described more fully herein.

The following definitions are used herein.

"Substantially" refers to an amount of at least about 90%, e.g., at least about 95%, at least about 98%, at least about 99%, or at least about 99.5%.

A platinum group metal (PGM) component refers to any compound that includes a PGM, more specifically, Pt, Pd, and/or Rh. For example, in certain embodiments, the PGM may be substantially (e.g., at least about 90% by weight) or wholly in metallic form (zero valance), or the PGM may be in an oxide form. Reference to PGM component allows for the presence of the PGM in any valance state.

"BET surface area" has its usual meaning, referring to the Brunauer-Emmett-Teller method for determining surface area by $N_2$-adsorption measurements. Unless otherwise stated, "surface area" refers to BET surface area.

"Support" in a catalytic material or catalyst washcoat refers to a material that receives a catalyst (including, for example, precious metals, stabilizers, promoters, binders, and the like) through precipitation, association, dispersion, impregnation, or other suitable methods.

"Refractory metal oxide supports" are exemplary types of supports that can be used according to the present disclosure, and include bulk alumina, ceria, zirconia, titania, silica, magnesia, neodymia, and other materials known for such use. Such materials are considered as providing durability to the resulting catalyst article.

As used herein, the term "molecular sieves," such as zeolites and other zeolitic framework materials (e.g. isomorphously substituted materials), refers to materials which may, in particulate form, support certain catalytic materials, e.g., platinum group metals. Molecular sieves are materials based on an extensive three-dimensional network of oxygen ions containing generally tetrahedral type sites and having a substantially uniform pore distribution. Exemplary molecular sieves useful herein are microporous materials, with an average pore size being no larger than 20 Å. The pore sizes of molecular sieves are defined by the ring size.

As used herein, the term "zeolite" refers to a specific example of a molecular sieve, which includes silicon and aluminum atoms. Zeolites are crystalline materials having rather uniform pore sizes which, depending upon the type of zeolite and the type and amount of cations included in the zeolite lattice, range from about 3 to 10 Angstroms in diameter. Zeolites generally comprise silica to alumina (SAR) molar ratios of 2 or greater.

The phrase "8-ring" zeolites refers to zeolites having 8-ring pore openings and double-six ring secondary building units and having a cage-like structure resulting from the connection of double six-ring (d6r) building units by 4 rings (s4r). Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, one group of zeolites has a single 4-ring (s4r) composite building unit in its framework structure. In the 4-ring, the "4" denotes the positions of tetrahedral silicon and aluminum atoms, and the oxygen atoms are located in between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms. Zeolitic structure types that have a d6r secondary building unit include AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN.

The term "aluminophosphate"" refers to another specific example of a molecular sieve, which includes aluminum and phosphate atoms. Aluminophosphates are crystalline materials having rather uniform pore sizes. Aluminophosphates generally comprise silica to alumina (SAR) molar ratios of 1 or less.

The term "high surface area refractory metal oxide supports" refers specifically to support particles having pores larger than 20 Å and a wide pore distribution. High surface area refractory metal oxide supports, e.g., alumina support materials, also referred to as "gamma alumina" or "activated alumina," typically exhibit a BET surface area of fresh material in excess of 60 square meters per gram ($m^2/g$), often up to about 200 $m^2/g$ or higher. Such activated alumina is usually a mixture of the gamma and delta phases of alumina, but may also contain substantial amounts of eta, kappa and theta alumina phases.

"Rare earth metal oxides" refers to one or more oxides of scandium, yttrium, and the lanthanum series, as defined in the Periodic Table of Elements. Rare earth metal oxides can be exemplary oxygen storage components and/or promoter materials. Examples of suitable oxygen storage components include ceria, praseodymia, or combinations thereof. Delivery of ceria can be achieved by the use of, for example, ceria, a mixed oxide of cerium and zirconium, and/or a mixed oxide of cerium, zirconium, and other rare earth element(s). Suitable promoters include one or more non-reducible oxides of one or more rare earth metals selected from the group consisting of lanthanum, tungsten, cerium, neodymium, gadolinium, yttrium, praseodymium, samarium, hafnium, and mixtures thereof.

"Alkaline earth metal oxides" refers to Group II metal oxides, which are exemplary stabilizer materials. Suitable stabilizers include, but are not limited to, non-reducible metal oxides wherein the metal is selected from the group consisting of barium, calcium, magnesium, strontium and mixtures thereof. In certain embodiments, the stabilizer comprises one or more oxides of barium and/or strontium.

A "washcoat" is a thin, adherent coating of a catalytic or other material applied to a refractory substrate, such as a honeycomb flow-through monolith substrate or a filter substrate, which is sufficiently porous to permit the passage therethrough of a gas stream being treated. A "washcoat layer," therefore, is defined as a coating that comprises support particles. A "catalyzed washcoat layer" is a coating comprised of support particles impregnated with catalytic components.

A "monolithic substrate" is a unitary structure that is homogeneous and continuous and has not been formed by affixing separate substrate pieces together.

"Selective Catalytic Reduction" (SCR) uses catalytic reduction of nitrogen oxides with a reductant in the presence of an appropriate amount of oxygen. Reductants may be, for example, hydrocarbon, hydrogen, and/or ammonia. SCR reactions in the presence of ammonia occur with the formation predominantly of nitrogen and steam according to the following two reactions:

$4\ NO + 4\ NH_3 + O_2 \rightarrow 4\ N_2 + 6\ H_2O$ $NO + NO_2 + 2\ NH_3 \rightarrow 2\ N_2 + 3\ H_2O.$ "Hydrocarbon Trap" (HCT) refers to the function of hydrocarbon trapping, which means that hydrocarbons are held by one or more materials (e.g., zeolite-based materials) at ambient temperatures and released at operating temperatures.

An "SCR-HCT catalyst" is a single module that provides both SCR and HCT functionalities.

"TWC" refers to the function of three-way conversion where hydrocarbons, carbon monoxide, and nitrogen oxides are substantially simultaneously converted. Typically, a TWC catalyst comprises one or more platinum group metals such as palladium and/or rhodium and optionally platinum; an oxygen storage component; and optionally promoters and/or stabilizers. Under rich conditions, TWC catalysts generate ammonia.

"LNT" refers to a lean-NOx trap, which generally contains platinum group metals and NOx trapping components, e.g., comprising ceria and/or alkaline earth metal oxides. A LNT catalyst is capable of adsorbing NOx under lean conditions and reducing the stored NOx to nitrogen under rich conditions.

"GDI" refers to gasoline direct injection, a fuel injection technique that injects highly pressurized gasoline via a common rail fuel line directly into the combustion chamber of engine cylinders (as opposed to conventional multi-point fuel injection that injects gasoline into the intake tract or cylinder port).

"AMOx" refers to an ammonia oxidation catalyst, which is a catalyst containing one or more metals suitable to convert ammonia, and which is generally supported on a support material.

Exhaust Gas Stream Systems

As noted above, in one embodiment, the disclosure provides a combination of two or more catalysts and, in particular, a combination of a TWC catalyst with an SCR-HCT catalyst downstream of the TWC catalyst. "Downstream," as generally employed herein, refers to the relative positioning of two or more components in a system with respect to one another, and describes such positioning by means of the typical gas flow direction through the system (i.e., a gas flow contacts a "downstream" component after it contacts an "upstream" component).

For applications in exhaust aftertreatment systems of light-duty gasoline vehicles, the SCR-HCT catalyst described herein provides additional conversions of hydrocarbons (HC) and nitrogen oxides (NOx) to supplement traditional exhaust gas systems to further the goal of meeting increasingly stringent regulations. The ammonia as a secondary emission generated by the upstream TWC catalyst is advantageously substantially converted on the SCR-HCT catalyst. Such a serial catalyst system provides improved performance for hydrocarbons (HC) during cold start and for nitrogen oxides (NOx) after light-off as a result of passive $NH_3$—SCR reactions.

Such combinations of a TWC catalyst with an SCR-HCT catalyst can further comprise one or more additional catalyst components, at least one of which can be positioned downstream of the SCR-HCT catalyst. The one or more additional catalyst components can comprise any components effective to reduce any undesirable emission (direct emission and/or passive emission). Such additional catalyst components include, but are not limited to, additional TWC catalysts, oxidation catalysts (OC), lean NOx trap (LNT) catalysts and the like, and combinations thereof. For example, a TWC catalyst and SCR-HCT catalyst in such a configuration can be employed in combination with a downstream catalyst having a platinum group metal (PGM) effective for oxidizing hydrocarbons. Effective PGM contents are generally known to one of skill in the art and are further described herein below. In such embodiments, the SCR-HCT catalyst can effectively store hydrocarbons during cold start and converts NOx during hot stage. Upon release of hydrocarbons from the SCR-HCT catalyst at hot stage, the downstream catalyst can convert the hydrocarbons.

Figure 1A:
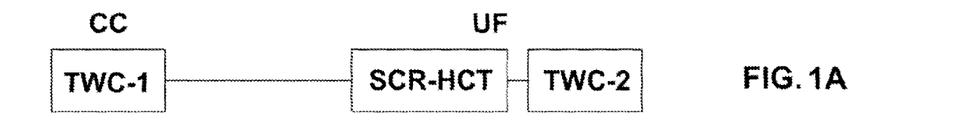
FIGS. 1A-1D provide flow diagrams of exemplary SCR-HCT integrated TWC systems downstream of stoichiometric gasoline engines.
Figure 1B:
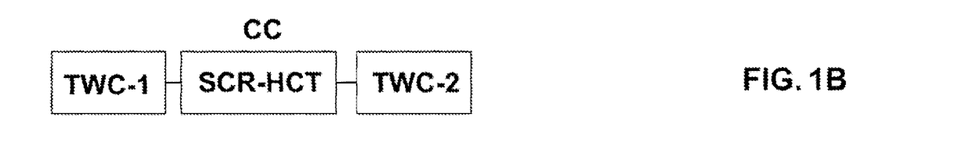
Figure 1C:
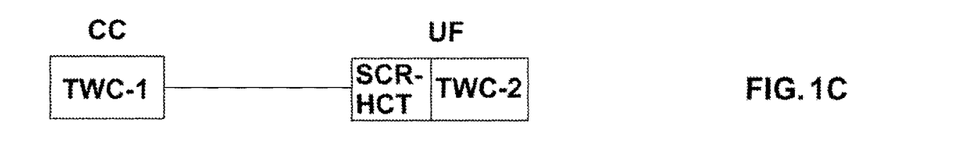
Figure 1D:
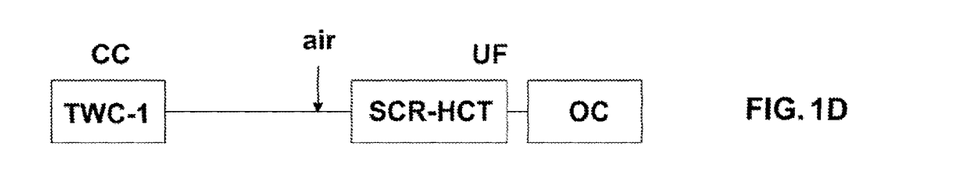
Figure 2:
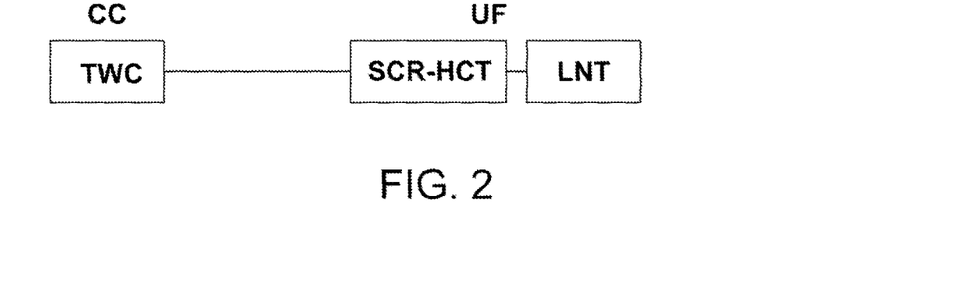
FIG. 2 provides a flow diagram of an exemplary SCR-HCT integrated TWC systems downstream of a lean gasoline direct injection engine.

Turning to the figures, FIGS. 1-2 depict exemplary TWC systems integrated with the SCR-HCT catalyst. In the context of these systems, "close-coupled" positions are understood as generally intended in the art, i.e., being closer to the engine than in traditional "underfloor" positions (which are beneath the floor of a vehicle). Generally, such "close-coupled" positions are within the engine compartment, i.e., beneath the hood of a vehicle, and adjacent to the exhaust manifold and, in such a position, close-coupled catalysts are commonly exposed to high temperature exhaust gas immediately exiting the engine after the engine has warmed up (and thus often serve to reduce hydrocarbon emissions during cold start, i.e., the period immediately following starting the engine from ambient conditions).

In FIG. 1, various systems directed to a stoichiometric gasoline engine are presented. FIG. 1A depicts a first/upstream three-way conversion (TWC-1) catalyst in a close-coupled position and the SCR-HCT catalyst followed by a second three-way conversion (TWC-2) catalyst in an underfloor position, taking advantage of lower aging temperatures for the zeolite-based catalyst. Optionally, an air injector supplies air upstream of the SCR-HCT catalyst.

FIG. 1B depicts a first/upstream three-way conversion (TWC-1) catalyst followed by the SCR-HCT catalyst followed by a second three-way conversion (TWC-2) catalyst, all in a close-coupled position. Optionally, an air injector supplies air upstream of the SCR-HCT combination.

FIG. 1C depicts a first/upstream three-way conversion (TWC-1) catalyst in a close-coupled position followed by the SCR-HCT catalyst in an underfloor position in tandem with a second three-way conversion (TWC-2) catalyst, that is, the SCR-HCT catalyst and TWC-2 are in the same module (or can be in separate modules). "Module," as used herein, is intended to have its usual meaning, i.e., a unit that has one or more catalysts associated therewith (e.g., contained therein or located thereon). Optionally, an air injector supplies air upstream of the SCR-HCT/TWC-2 catalyst.

FIG. 1D depicts an upstream three-way conversion (TWC) catalyst in a close-coupled position followed by the SCR-HCT combination in an underfloor position where an air injector supplies air upstream of the SCR-HCT catalyst, followed by an oxidation catalyst (OC), where the secondary air supply boosts SCR activity and HC conversion. A further option is to locate the TWC-1, the SCR-HCT catalyst, and the third PGM catalyst all in one module or can. As needed, the SCR-HCT catalyst may be placed on a gasoline particulate filter (GPF) to meet requirements for removal of particulate matters.

Certain embodiments (including a TWC catalyst, SCR-HCT catalyst, and PGM-containing catalyst) can function as follows. In operation of a stoichiometric gasoline engine, fuel-to-air ratios oscillate between rich and lean of stoichiometric conditions. The close coupled TWC catalyst converts the majority of emission pollutants and, under rich conditions with an excess of reductants and a deficiency of oxygen, passively generates ammonia via over-reduction of NOx. The SCR-HCT catalyst traps breakthrough hydrocarbons during cold start and releases the stored HC at a relatively high exhaust temperature. Simultaneously, the SCR-HCT catalyst stores ammonia generated by the upstream TWC catalyst and converts breakthrough NOx by means of $NH_3$—SCR reactions. The downstream PGM-containing catalyst converts the hydrocarbons released from the SCR-HCT catalyst at the relatively high exhaust temperature and abates additional breakthrough emission pollutants.

FIG. 2 depicts a lean gasoline direct injection (GDI) engine system, comprising an upstream three-way conversion (TWC) catalyst in a close-coupled position and the SCR-HCT catalyst followed by a lean NOx trap catalyst in an underfloor position. As needed, the SCR-HCT catalyst may be placed on a gasoline particulate filter (GPF) to meet requirements of particulate matters.

In operation of the lean gasoline direct injection engine, fuel-to-air ratio is primarily maintained lean of stoichiometric conditions with periodic regeneration events that are under rich stoichiometric conditions. Thus, a lean NOx trap (LNT) catalyst is placed in the downstream of the SCR-HCT catalyst to convert the hydrocarbons released from the SCR-HCT catalyst and to store NOx under lean conditions and abate the stored NOx under rich conditions.

SCR-HCT Catalysts

SCR-HCT catalysts as described herein can be provided independently or can comprise part of a catalytic system. The SCR-HCT combination may comprise, for example, an SCR catalytic material comprising a first zeolite and an HCT material comprising a second zeolite that is different from the first zeolite. In some embodiments, both the SCR and HCT catalytic materials are deposited on a monolithic substrate. This dual-component designs allow for wide-range tuning of SCR and HCT functions by varying the weight ratio of the first and second zeolites. In one or more embodiments, the ratio of the first zeolite to the second zeolite is in a range of 10:1 to 1:10. The ability to tune this ratio can be beneficial, as it allows for greater emphasis in some embodiments on SCR function (e.g., with a weight ratio of first zeolite to second zeolite greater than 1:1, e.g., 1:1 to 10:1) and, in other embodiments, on HCT function (e.g., with a weight ratio of first zeolite to second zeolite less than 1:1, e.g., 1:10-1:1). In some embodiments, a substantially equivalent weight ratio is useful, e.g., having a ratio of first zeolite to second zeolite of about 2:1 to 1:2 or 1.5:1 to 1:1.5 (e.g., about 1:1). The SCR-HCT catalyst is advantageously substantially (including wholly) free of PGMs. The SCR-HCT catalyst may optionally include other components, such as base metal oxides. Such additional components can be, e.g., added to either catalytic material or can be included as a separate layer or zone to accommodate additional functionalities as desired.

Figure 3:
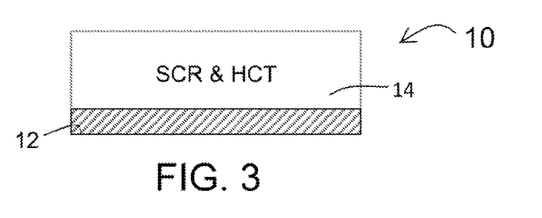
FIG. 3 is a schematic of an exemplary SCR-HCT catalyst.
Figure 4A:
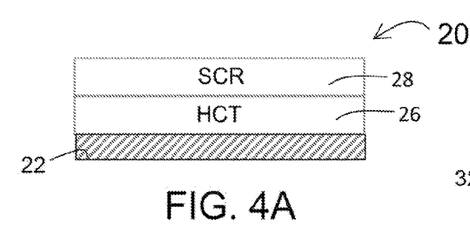
FIGS. 4A and 4B are schematics of other exemplary SCR-HCT catalysts.
Figure 4B:
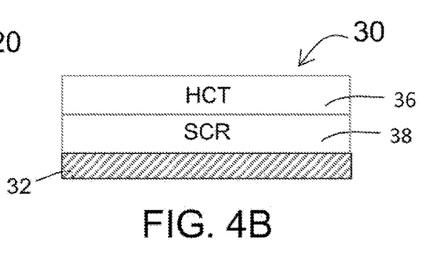
Figure 5A:
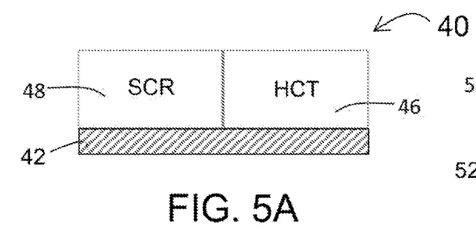
FIGS. 5A and 5B are schematics of yet other exemplary SCR-HCT catalysts.
Figure 5B:
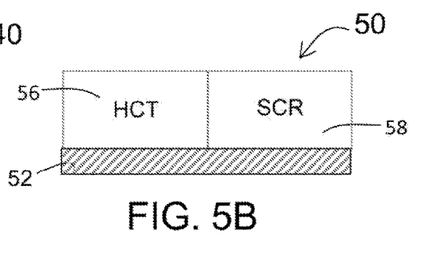

The SCR and HCT catalyst materials can be disposed in various manners with respect to one another. As depicted in FIG. 3, in one embodiment, an exemplary SCR-HCT catalyst 10 comprises both SCR and HCT materials as a homogenous mixture and deposited in a single layer 14 on a substrate 12. In other embodiments, each catalytic material may be separately layered in any order on the substrate. In FIG. 4A, SCR-HCT catalyst 20 comprises an outer layer 28 comprising an SCR catalytic material on an inner layer 26, comprising HCT material, which is deposited on substrate 22. In FIG. 4B, SCR-HCT catalyst 30 comprises an outer layer 36 comprising HCT catalytic material on an inner layer 38, comprising SCR catalytic material, which is deposited on substrate 32. In other embodiments, each catalytic material may be zoned (in any order). In FIG. 5A, SCR-HCT catalyst 40 comprises an upstream zone 48 comprising SCR catalytic material and a downstream zone 46 comprising HCT material, which is deposited on substrate 42. The SCR catalytic material may reside in a first zone that may span any percent in the range of 10-90% of the substrate from the upstream end and the HCT material may span any percent in the range of 90-10% of the substrate from the downstream end. In FIG. 5B, SCR-HCT combination 50 comprises an upstream zone 56 comprising HCT material and a downstream zone 58 comprising SCR catalytic material, which is deposited on the substrate 52. The HCT material may, in some embodiments reside in a first zone that may span any percent in the range of 10-90% of the area of the substrate from the upstream end and the SCR catalytic material may span any percent in the range of 90-10% of the area of the substrate from the downstream end.

The combination of a selective catalytic reduction (SCR) catalyst with hydrocarbon trap (HCT), or the SCR-HCT catalyst, is effective to store hydrocarbons during cold start and to convert nitrogen oxides (NOx) during hot stage. In particular embodiments, it is beneficial to employ an oxidation catalyst downstream of the SCR-HCT catalyst to convert the hydrocarbons released from the SCR-HCT catalyst during hot stage.

An effective amount of catalyst associated with an SCR-HCT catalyst is generally understood by one of skill in the art. In one particular embodiment, a SCR-HCT catalyst comprising Cu-CHA and H-Beta is used, e.g., by coating such a catalyst composition as a washcoat on a ceramic substrate. These components can be in varying ratios with respect to one another, e.g., about a 10:1 to 1:10 weight ratio, e.g., about a 2:1 to 1:2 weight ratio, including roughly a 1:1 weight ratio. In certain embodiments, total catalyst loading can be such that the SCR-HCT comprises a washcoat loading (after calcination) of about 1 to about 10 $g/in^3$ (e.g., about 1 to 6 or about 2 to 4 $g/in^3$), where the washcoat can comprise, for example, about 1 to 6 wt. % CuO, e.g., about 2 to about 4 wt. % CuO.

SCR Catalytic Material

In certain embodiments, the SCR catalytic material comprises one or more molecular sieve materials. In some embodiments, the SCR catalytic material comprises 8-member ring small pore molecular sieves containing a metal promoter. As used herein, "small pore" refers to pore openings which are smaller than about 5 Angstroms (e.g., about 2-5 Å, about 2-4 Å, about 3-5 Å, or about 3-4 Å, for example on the order of ~3.8 Angstroms. One specific 8-member ring small pore molecular sieve is an 8-member ring small pore zeolite.

In some embodiments, the SCR catalytic material comprises a zeolite comprising a d6r unit. Thus, in one or more embodiments, the SCR catalytic material comprises a zeolite having a structure type selected from AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof. In other specific embodiments, the SCR catalytic material comprises a zeolite with a structure type selected from the group consisting of CHA, AEI, AFX, ERI, KFI, LEV, and combinations thereof. In still further specific embodiments, the SCR catalytic material comprises a zeolite with a structure type selected from CHA and AEI. In one or more very specific embodiments, the SCR catalytic material comprises a zeolite with the CHA structure type.

In certain embodiments, the SCR catalytic material comprises zeolitic chabazite, which is a naturally occurring tectosilicate mineral of a zeolite group with an approximate formula represented by $(Ca,Na_2,K_2,Mg)Al_2Si_4O_{12}\cdot 6H_2O$ (e.g., hydrated calcium aluminum silicate). Three synthetic forms of zeolitic chabazite that may find use in the SCR catalysts disclosed herein are described in "Zeolite Molecular Sieves,"" by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et al; Zeolite D, described in British Patent No. 868,846 (1961); and Zeolite R, described in U.S. Pat. No. 3,030,181 to Milton, which are all hereby incorporated by reference. Synthesis of another synthetic form of zeolitic chabazite, SSZ-13, is described in U.S. Pat. No. 4,544,538 to Zones, which is hereby incorporated by reference. A method of making yet another synthetic molecular sieve having chabazite structure, SAPO-44, is described in U.S. Pat. No. 6,162,415 to Liu et al., which is hereby incorporated by reference.

The ratio of silica to alumina in molecular sieves useful as SCR catalytic materials can vary over a wide range. In one or more embodiments, molecular sieves useful as SCR catalytic materials have a silica to alumina molar ratio (SAR) in the range of 2 to 300, including 5 to 250; 5 to 200; 5 to 100; and 5 to 50. In one or more specific embodiments, the molecular sieve has a silica to alumina molar ratio (SAR) in the range of 10 to 200, 10 to 100, 10 to 75, 10 to 60, 10 to 50, 15 to 100, 15 to 75, 15 to 60, 15 to 50, 20 to 100, 20 to 75, 20 to 60, and 20 to 50. In more specific embodiments, with regard to the molecular sieve having any of the immediately preceding SAR ranges, the spherical particle of the molecular sieve has a particle size d50 in the range of about 1.0 to about 5 microns, and more specifically, about 1.0 to about 3.5 microns, and the individual crystals of a molecular sieve component have a crystal size in the range of about 100 to about 250 nm.

Metal-promoted zeolite catalysts including, among others, iron-promoted and copper-promoted zeolite catalysts, for the selective catalytic reduction of nitrogen oxides with ammonia are also suitable. The promoter metal may be selected from Cu, Fe, Co, Ni, La, Ce, Mn, V, Ag, and combinations thereof. In specific embodiments, the promoter metal is Cu, Fe, or combinations thereof. Metal-promoted, particularly copper promoted aluminosilicate zeolites having the CHA structure type and a silica to alumina molar ratio greater than 1, have recently solicited a high degree of interest as catalysts for the SCR of oxides of nitrogen in lean burning engines using nitrogenous reductants. The promoter metal content in such catalysts, calculated as the oxide, is, in one or more embodiments, at least about 0.1 wt. %, reported on a volatile-free basis. In specific embodiments, the promoter metal comprises Cu, and the Cu content, calculated as CuO is in the range of up to about 10 wt. %, including 9, 8, 7, 6, 5, 4, 3, 2, 1, 0.5, and 0.1 wt. %, in each case based on the total weight of the calcined zeolite component reported on a volatile free basis. In specific embodiments, the Cu content, calculated as CuO, is in the range of about 1 to about 4 wt. %.

For specific metal-promoted zeolite catalysts having an SAR of 2 to 300, the Cu content may be in the range of 0.1-10 wt. %, or 0.5 to 8 wt. %, or 0.8 to 6 wt. %, or 1 to 4 wt. %, or even 2-3 wt. % in each case based on the total weight of the calcined zeolite component reported on a volatile free basis. For specific metal-promoted zeolite catalysts having an SAR of 5 to 250, the Cu content may be in the range of 0.1 to 10 wt. %, or 0.5 to 8 wt. %, or 0.8 to 6 wt. %, or 1 to 4 wt. %, or even 2 to 3 wt. % in each case based on the total weight of the calcined zeolite component reported on a volatile free basis. For specific metal-promoted zeolite catalysts having an SAR of 5 to 200, the Cu content may be in the range of 0.1 to 10 wt. %, or 0.5 to 8 wt. %, or 0.8 to 6 wt. %, or 1 to 4 wt. %, or even 2 to 3 wt. % in each case based on the total weight of the calcined zeolite component reported on a volatile free basis. For specific metal-promoted zeolite catalysts having an SAR of 5 to 100, the Cu content may be in the range of 0.1 to 10 wt. %, or 0.5 to 8 wt. %, or 0.8 to 6 wt. %, or 1 to 4 wt. %, or even 2 to 3 wt. % in each case based on the total weight of the calcined zeolite component reported on a volatile free basis. For specific metal-promoted zeolite catalysts having an SAR of 5 to 50, the Cu content may be in the range of 0.1 to 10 wt. %, or 0.5 to 8 wt. %, or 0.8 to 6 wt. %, or 1 to 4 wt. %, or even 2 to 3 wt. % in each case based on the total weight of the calcined zeolite component reported on a volatile free basis. For specific metal-promoted zeolite catalysts having an SAR of 10 to 200, the Cu content may be in the range of 0.1-10 wt. %, or 0.5 to 8 wt. %, or 0.8 to 6 wt. %, or 1 to 4 wt. %, or even 2 to 3 wt. % in each case based on the total weight of the calcined zeolite component reported on a volatile free basis. For specific metal-promoted zeolite catalysts having an SAR of 10 to 100, the Cu content may be in the range of 0.1-10 wt. %, or 0.5 to 8 wt. %, or 0.8 to 6 wt. %, or 1 to 4 wt. %, or even 2 to 3 wt. % in each case based on the total weight of the calcined zeolite component reported on a volatile free basis. For specific metal-promoted zeolite catalysts having an SAR of 10 to 75, the Cu content may be in the range of 0.1 to 10 wt. %, or 0.5 to 8 wt. %, or 0.8 to 6 wt. %, or 1 to 4 wt. %, or even 2 to 3 wt. % in each case based on the total weight of the calcined zeolite component reported on a volatile free basis.

For specific metal-promoted zeolite catalysts having an SAR of 10 to 60, the Cu content may be in the range of 0.1 to 10 wt. %, or 0.5 to 8 wt. %, or 0.8 to 6 wt. %, or 1 to 4 wt. %, or even 2 to 3 wt. % in each case based on the total weight of the calcined zeolite component reported on a volatile free basis. For specific metal-promoted zeolite catalysts having an SAR of 10 to 50, the Cu content may be in the range of 0.1 to 10 wt. %, or 0.5 to 8 wt. %, or 0.8 to 6 wt. %, or 1 to 4 wt. %, or even 2 to 3 wt. % in each case based on the total weight of the calcined zeolite component reported on a volatile free basis. For specific metal-promoted zeolite catalysts having an SAR of 15 to 100, the Cu content may be in the range of 0.1 to 10 wt. %, or 0.5 to 8 wt. %, or 0.8 to 6 wt. %, or 1 to 4 wt. %, or even 2-3 wt. % in each case based on the total weight of the calcined zeolite component reported on a volatile free basis. For specific metal-promoted zeolite catalysts having an SAR of 15 to 75, the Cu content may be in the range of 0.1 to 10 wt. %, or 0.5 to 8 wt. %, or 0.8 to 6 wt. %, or 1 to 4 wt. %, or even 2 to 3 wt. % in each case based on the total weight of the calcined zeolite component reported on a volatile free basis. For specific metal-promoted zeolite catalysts having an SAR of 15 to 60, the Cu content may be in the range of 0.1 to 10 wt. %, or 0.5 to 8 wt. %, or 0.8 to 6 wt. %, or 1 to 4 wt. %, or even 2 to 3 wt. % in each case based on the total weight of the calcined zeolite component reported on a volatile free basis. For specific metal-promoted zeolite catalysts having an SAR of 15 to 50, the Cu content may be in the range of 0.1 to 10 wt. %, or 0.5 to 8 wt. %, or 0.8 to 6 wt. %, or 1 to 4 wt. %, or even 2 to 3 wt. % in each case based on the total weight of the calcined zeolite component reported on a volatile free basis.

For specific metal-promoted zeolite catalysts having an SAR of 20 to 100, the Cu content may be in the range of 0.1 to 10 wt. %, or 0.5 to 8 wt. %, or 0.8 to 6 wt. %, or 1 to 4 wt. %, or even 2 to 3 wt. % in each case based on the total weight of the calcined zeolite component reported on a volatile free basis. For specific metal-promoted zeolite catalysts having an SAR of 20 to 75, the Cu content may be in the range of 0.1 to 10 wt. %, or 0.5 to 8 wt. %, or 0.8 to 6 wt. %, or 1 to 4 wt. %, or even 2 to 3 wt. % in each case based on the total weight of the calcined zeolite component reported on a volatile free basis.

Another exemplary molecular sieve that can be useful as an SCR catalytic material is an aluminophosphate. Types of aluminophosphates include: silicoaluminophosphate (SAPO), metallic aluminophosphate (MeAPO), and metallic silicoaluminophosphate (MeSAPO). Synthesis of a synthetic form of an exemplary aluminophosphate molecular sieve, silicoaluminophosphate 34 (SAPO-34), is described in U.S. Pat. No. 4,440,871 to Lok et al. and U.S. Pat. No. 7,264,789 to Van Den et al., which are hereby incorporated by reference. A method of making yet another synthetic molecular sieve, SAPO-44, is described in U.S. Pat. No. 6,162,415 to Liu et al., which is hereby incorporated by reference.

HCT Material

Hydrocarbon-trapping materials, in various embodiments, are generally various types of zeolites, such as silicates, modenites, Y-type, ZSM-5, MR and/or beta-zeolite. An exemplary HCT catalytic material is a zeolite of a channel structure comprising 10-member rings or 12-member rings (which can optionally be ion-exchanged). Since the engine-out hydrocarbons have various sizes, one design of the HCT component comprises a combination of multiple materials (e.g., multiple zeolites) with different porosities in order to trap most HC species. Exemplary HCT materials may possess a silica to alumina ratio (SAR) ranging from 5 to 1000. Zeolites with relatively low SAR (i.e., 5 to 100) have more acidic sites in the zeolitic framework and are known to oligomerize unsaturated hydrocarbons, a feature desired for retaining certain HC species. On other hand, zeolites with relatively high SAR (100-1000) are thermally more stable and can thus be ideal for trapping larger HC species. As a consequence, a combination of two or more zeolites is advantageously employed (i.e., a multi-component HCT) and, in some embodiments, such a combination may comprise a first zeolite with a SAR of 5-100 and a second zeolite of a SAR of 100-1000. Zeolites in Fe or Cu-exchanged forms may also be used as HCT materials.

Platinum Group Metal (PGM)-Containing Catalysts

Platinum group metals (PGMs) can be used in various types of catalysts employed in the systems and methods disclosed herein. For example, in certain embodiments, PGM catalytic materials can be included in a TWC catalyst located upstream of the SCR-HCT catalyst and/or, in certain embodiments, PGM catalytic material can be included in a third catalyst downstream of the SCR-HCT catalyst (which can be, e.g., a TWC catalyst, a lean NOx trap (LNT), an oxidation catalyst, or the like). One of skill in the art can readily understand useful catalytic amounts of PGMs to incorporate within such PGM-containing catalysts. For example, in varying embodiments, amounts of PGMs can be within the range of about 1 to about 50 wt. % of a given catalyst composition (e.g., a washcoat), such as about 1 to about 25 wt. % or about 1 to about 10 wt. % based on the overall washcoat.

Upstream TWC Catalysts

The upstream TWC catalyst typically comprises one or more platinum group metals such as palladium (Pd) and/or rhodium (Rh) and optionally platinum (Pt); an oxygen storage component (OSC); and optionally, one or more promoters and/or stabilizers. TWC catalysts may be designed in layers with specific locations of ingredients to enhance certain chemistries and to accommodate various engine designs. Certain systems disclosed herein take advantage of ammonia production from the upstream TWC catalyst in a close-coupled position (TWC as CC1) (as the ammonia can participate in SCR within the SCR-HCT catalyst). Exemplary designs to enhance ammonia generation upstream of the SCR-HCT catalyst include, but are not limited to a TWC catalyst with Pd in a top coat (T/C); a TWC catalyst including Pt; and TWC catalyst with both Pt and BaO (like TWC-LNT) for lean GDI application. One possible design is a Pd-only TWC catalyst.

A person of skill in the art will recognize that the catalyst loadings of TWC catalysts can vary. For example, in one particular embodiment, an upstream TWC catalyst can comprise one or more platinum group metals, one or more base metal oxides, and one or more rare earth metal oxides, e.g., with a total washcoat loading of about 1 to 10 g/in$^3$, such as about 1 to 5 g/in$^3$ (comprising any number of layers, e.g., about 1-5 layers or about 1-3 layers), e.g., having a total platinum group metal content of about 1 to about 6 wt. % of the washcoat, such as about 1 to about 3 wt. % of the washcoat, a total base metal oxide content (such as cerium oxide, zirconium oxide, and barium oxide) of about 50 to about 80 wt. % of the washcoat, such as about 50 to about 70 wt. % of the washcoat, and a rare earth metal oxide content of about 7.5 to about 15 wt. %, such as about 7.5 to about 12.5 wt. % of the washcoat, with e.g., about 15 to about 40 wt. % carrier (e.g., alumina)

Downstream PGM-Containing Catalysts

Typical downstream platinum group metal (PGM)-containing catalysts contain catalytic material that is effective to at least oxidize hydrocarbons. Such catalysts may be designed as conventional three-way conversion (TWC) catalysts that contain OSCs, which are effective to substantially simultaneously convert hydrocarbons, carbon monoxides, and nitrogen oxides. TWC catalysts with improvement in HC light-off and steam reforming (for example, those having all three metals (Pd, Rh, and Pt) and/or those having extra Rh), may be desired in particular embodiments.

Another PGM-containing catalyst may be a lean NOx trap (LNT) that contains NOx trapping components such as barium oxide (BaO) and/or ceria (CeO$_2$) and, optionally, one or more OSC components.

Another exemplary PGM-containing catalyst is an oxidation catalyst (OC). Specific PGM-containing catalysts may, in some embodiments, be effective as only oxidation catalysts, being free of one or more of the following: any kind of oxygen storage components (OSC), NOx trapping components, and HC trapping components. One exemplary OC for use in the systems disclosed herein is a platinum-only design. In some embodiments, a platinum-palladium oxidation catalyst may be desirable. An ammonia oxidation (AMOx) catalyst comprising a copper zeolite in conjunction with a supported platinum group metal (e.g., Pt—$Al_2O_3$) may also, in certain embodiments, be desirable.

The downstream PGM-containing catalyst may be layered or zoned as desired to provide additional beneficial functionalities. Again, one of skill in the art can readily understand useful catalytic amounts of PGMs to incorporate within these varying types of PGM-containing catalysts. For example, in varying embodiments, amounts of PGMs can be within the range of about 1 to about 50 wt. % of a given catalyst composition (e.g., a washcoat), such as about 1 to about 25 wt. % or about 1 to about 10 wt. % based on the overall washcoat.

Catalyst Composites

Catalyst composites may be prepared from catalytic materials in one or more layers on a carrier. A dispersion of any one or more of the catalytic materials as described herein may be used to form a slurry for a washcoat. To the slurry may be added any desired additional ingredients such as other platinum group metals, other supports, other stabilizers and promoters, and typically for TWC catalysts, one or more oxygen storage components.

In one or more embodiments, the slurry is acidic, having a pH of about 2 to about 7. The pH of the slurry may be lowered by the addition of an adequate amount of an inorganic or organic acid to the slurry. Combinations of both an inorganic and organic acid can be used to modify the pH of the slurry when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. It is noted that selection of the acid may be relevant such that addition of the acid should not introduce elements that are undesirable in the context of catalytic materials. Thereafter, if desired, water-soluble or water-dispersible compounds of oxygen storage components, e.g., cerium-zirconium composite, a stabilizer, e.g., barium acetate, and a promoter, e.g., lanthanum nitrate, may be added to the slurry. The slurry may thereafter comminuted to result in substantially all of the solids having particle sizes of less than about 20 microns, i.e., about 0.1 to 15 microns, in an average diameter. The comminution may be accomplished in a ball mill or other similar equipment, and the solids content of the slurry may be, e.g., about 10-50 wt. %, more particularly about 10-40 wt. %. The carrier may then be dipped one or more times in such slurry or the slurry may be coated on the carrier such that there will be deposited on the carrier the desired loading of the washcoat/metal oxide composite, e.g., about 1.0 to about 6.5 g/in$^3$. Thereafter the coated carrier is calcined by heating, e.g., at 500-600° C. for a period of time sufficient to provide the calcining (e.g., about 1 to about 3 hours).

Typically, when a platinum group metal is desired as a component of a catalyst composite, a metal component is utilized in the form of a compound or complex to achieve dispersion of the component on a refractory metal oxide support, e.g., activated alumina or a ceria-zirconia composite. For the purposes herein, the term "metal component" means any compound, complex, or the like which, upon calcination or use thereof, decomposes or otherwise converts to a catalytically active form, usually the metal or the metal oxide. Water-soluble or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition. Further, in such embodiments, the liquid medium must further be capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the precious metals are beneficially utilized. During the calcination step, or at least during the initial phase of use of the composite, such compounds are converted into a catalytically active form of the metal or a compound thereof.

Additional layers may be prepared and deposited upon previous layers in the same manner as described above for deposition of any layer upon the carrier.

Carrier

Catalytic materials of all types are, in preferred embodiments, disposed on a carrier, e.g., for exhaust gas applications. One exemplary type of carrier useful in the context of the present disclosure is a monolithic substrate.

The carrier may be any of those materials typically used for preparing catalyst composites, and will preferably comprise a ceramic or metal honeycomb structure. Any suitable carrier may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e., cells) per square inch of cross section. The carrier can also, in some embodiments, be a wall-flow filter substrate, where the channels are alternately blocked, allowing a gaseous stream entering the channels from one direction (inlet direction), to flow through the channel walls and exit from the channels from the other direction (outlet direction). A catalyst, such as a dual oxidation catalyst composition, can be coated on the wall-flow filter. If such a carrier is utilized, the resulting system is advantageously capable of removing particulate matters along with gaseous pollutants. The wall-flow filter carrier can be made from materials commonly known in the art, such as cordierite or silicon carbide.

Carriers useful according to the present disclosure may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate or the like, and combinations thereof. The carriers useful for the catalysts of the present invention may also be metallic in nature and be composed of one or more metals or metal alloys. Metallic carriers may be employed in various shapes such as corrugated sheet or monolithic form. Preferred metallic supports include heat-resistant metals and metal alloys such as titanium and stainless steel, as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surface of the metal carriers may, in some embodiments, be oxidized at high temperatures, e.g., 1000° C. and higher, to improve the resistance to corrosion of the alloys by forming an oxide layer on the surfaces of the carriers. Such high temperature-induced oxidation may enhance the adherence of the refractory metal oxide support and catalytically promoting metal components to the carrier.

In some embodiments, one or more catalyst materials may be deposited on an open cell foam substrate. Such substrates are well known in the art, and are typically formed of refractory ceramic or metallic materials.

Before describing several exemplary embodiments of the invention, it is to be understood that the invention is not limited to the details of construction or process steps set forth in the following description. The invention is capable of other embodiments and of being practiced in various ways. In the following, preferred designs are provided, including such combinations as recited used alone or in unlimited combinations, the uses for which include catalysts, systems, and methods of other aspects of the present invention.

Specific Embodiments

Various embodiments are listed below. It will be understood that the embodiments listed below may be combined with all aspects and other embodiments in accordance with the scope of the invention.

Embodiment 1 is an SCR-HCT catalyst comprising a selective catalytic reduction catalyst and a hydrocarbon trap. The SCR catalytic material and the HCT may be deposited on a monolithic substrate, e.g., in a homogeneous mixture thereon, in a layered configuration, or in a zoned configuration.

Embodiment 2 is an emissions treatment system for an exhaust stream of an internal combustion engine including hydrocarbons, carbon monoxide, and nitrogen oxides, the emission treatment system comprising: an exhaust conduit in fluid communication with the internal combustion engine via an exhaust manifold; a first three-way conversion catalyst (TWC-1) located downstream of the internal combustion engine in the exhaust conduit; an SCR-HCT catalyst comprising a selective catalytic reduction catalyst and a hydrocarbon trap downstream of the TWC-1 in the exhaust conduit; and a third catalyst downstream of the SCR-HCT combination in the exhaust conduit, the third catalyst comprising a platinum group metal (PGM) in an amount effective to oxidize hydrocarbons. It is noted that "exhaust manifold" as used herein is intended to have its general meaning, i.e., a unit that collects engine exhaust gas and, where multiple engine exhaust gas outlets are present, serves to combine such gases therein to give a combined exhaust gas stream. Typically, this combined exhaust gas stream passes to an "exhaust conduit," which is in fluid communication with the exhaust manifold. "Exhaust conduit" also has its general meaning, i.e., a channel through which an exhaust gas (e.g., the combined exhaust gas stream) passes from the exhaust manifold before being released.

Embodiment 3 is an emissions treatment system for an exhaust stream of an internal combustion engine including hydrocarbons, carbon monoxide, and nitrogen oxides, the emission treatment system comprising: an exhaust conduit in fluid communication with the internal combustion engine via an exhaust manifold; a first three-way conversion catalyst (TWC-1) located downstream of the internal combustion engine in the exhaust conduit that is effective to produce ammonia; an SCR-HCT catalyst comprising a selective catalytic reduction (SCR) catalyst and a hydrocarbon trap (HCT) downstream of the TWC-1 in the exhaust conduit, the SCR catalyst comprising a first molecular sieve and the HCT catalyst comprising a second molecular sieve that is different from the first molecular sieve; and a second three-way conversion catalyst (TWC-2) downstream of the SCR-HCT catalyst in the exhaust conduit that comprises a platinum group metal (PGM) and an oxygen storage component in a combined amount effective to oxidize hydrocarbons.

Embodiment 4 is a method for treating exhaust gases comprising contacting a gaseous stream, the method comprising hydrocarbons (HCs), carbon monoxide (CO), and nitrogen oxides (NOx), comprising passing the gaseous stream through any of the emissions treatment systems disclosed herein, wherein: upon contact with the TWC-1, hydrocarbons, carbon monoxide, and nitrogen oxides are substantially simultaneously converted and ammonia is generated in an amount effective for the SCR catalyst; upon contact with the SCR-HCT catalyst, ammonia is stored in the SCR catalyst and used for reduction of breakthrough NOx, and hydrocarbons are trapped in the HCT during cold start and released at higher temperatures; and upon contact with the third catalyst, hydrocarbons released from the HCT are lit-off.

Embodiment 5 is a method of making an emissions treatment, the method comprising: providing a first three-way conversion (TWC-1) catalyst located downstream of an internal combustion engine in an exhaust conduit; locating an SCR-HCT catalyst comprising a selective catalytic reduction (SCR) catalyst and a hydrocarbon trap (HCT) downstream of the TWC-1 in the exhaust conduit; and locating a third catalyst downstream of the SCR-HCT combination in the exhaust conduit, the third catalyst comprising a platinum group metal (PGM) in an amount effective to oxidize hydrocarbons.

Each of embodiments one through five herein may have the following design features, alone or in combination:

The SCR-HCT catalyst, in some embodiments, comprises an SCR catalytic material that comprises a first molecular sieve and an HCT material comprises a second molecular sieve that is different from the first molecular sieve, both catalytic materials deposited on a monolithic substrate;

The first molecular sieve, in some embodiments, comprises a Cu-CHA zeolite;

The second molecular sieve, in some embodiments, comprises a Beta zeolite;

A weight ratio of the SCR catalytic material to the HCT material, in some embodiments, is in a range of 10:1 to 1:10 (or 4:1 to 1:4 or 1.5:1 to 1:1.5 or is even 1:1);

The monolithic substrate, in some embodiments, is a flow-through substrate or a wall-flow filter;

The first molecular sieve, in some embodiments, comprises an 8-member ring small pore zeolite containing a metal promoter and the second molecular sieve comprises a 10-member ring medium pore or a 12-member ring large pore zeolite that optionally comprises a metal promoter;

The 8-member ring zeolite, in some embodiments, is ion-exchanged with one or more of copper and iron having a CHA, SAPO, or AEI structure;

The 10- or 12-member ring zeolite, in some embodiments, comprises the metal promoter and a structure type of ZSM-5, Beta, or MFI in a $H^+$, $NH^{4+}$, Cu-exchanged, or Fe-exchanged form;

The HCT material and the SCR catalytic material are, in some embodiments, in a homogenously mixed layer on the monolithic substrate; The HCT material and the SCR catalytic material are, in some embodiments, in a layered configuration on the monolithic substrate;

The HCT material and the SCR catalytic material are, in some embodiments, in a zoned configuration on the monolithic substrate;

The third catalyst, in some embodiments, comprises one of the following: a second three-way conversion (TWC-2) catalyst, an oxidation catalyst (OC), or a lean NOx trap (LNT);

The third catalyst, in some embodiments, is heated by an external source; The third catalyst, in some embodiments, comprises a carrier having a smaller thermal mass relative to carriers for the TWC-1;

The TWC-1, in some embodiments, is located in a close-coupled position; and the SCR-HCT combination and the third catalyst are located in an underfloor position;

The TWC-1, the SCR-HCT catalyst, and the third catalyst, in some embodiments, are all located in one module;

The SCR-HCT catalyst and the third catalyst, in some embodiments, are both located in one module; The emissions treatment system, in some embodiments, further comprises an air supply upstream of the SCR-HCT catalyst; and In some embodiments, when the third catalyst is a TWC-2, upon contact with the TWC-2, hydrocarbons released from the HCT are lit-off and breakthrough CO, HC, and NOx are converted.

EXAMPLES

The following non-limiting examples shall serve to illustrate the various embodiments of the present invention. In each of the examples, the carrier was cordierite.

Example 1

This example describes the preparation of a SCR-HCT catalyst comprising Cu-CHA and H-Beta. Cu—SSZ-13 (SAR=30, 3% CuO) and H-Beta (SAR=250), in 1:1 weight ratio, were formulated into a slurry and coated on a ceramic substrate having a cell density of 400 cells per square inch and a wall thickness of 4 mil (about 100 μm). The washcoat loading was 3.2 g/in$^3$ after calcination at 550° C. The SCR-HCT catalyst was aged at 850° C. for 10 hours in a flow of air and 10% of steam.

Example 2

This example describes the preparation of an upstream TWC-1 catalyst comprising a two-layer washcoat architecture. The bottom coat, with a washcoat loading of 2.08 g/in$^3$, contained 1.53 wt. % palladium, 20.7 wt. % of a high surface area gamma-alumina (BET surface area: 150 m$^2$/g), 20.9 wt. % cerium oxide, 40.8 wt. % zirconium oxide, 4.8 wt. % barium oxide, and 11.3 wt. % of rare earth metal oxides as stabilizers. The top coat, with a washcoat loading of 1.60 g/in$^3$, contained 0.18 wt. % rhodium, 31.3 wt. % of the same high surface area gamma-alumina, 6.2 wt. % cerium oxide, 50.0 wt. % zirconium oxide, 3.1 wt. % barium oxide, and 9.4 wt. % of rare earth metal oxides as stabilizers. The slurries were milled to reduce the average particle size and then coated on a ceramic substrate having a cell density of 600 cells per square inch and a wall thickness of 4 mil (about 100 μm). The TWC-1 catalyst was aged on a gasoline engine for 50 hours with a peak temperature of 1050° C.

Example 3

This example represents a downstream TWC-2 catalyst that has the same composition as that of EXAMPLE 2. The catalyst was aged at 850° C. for 10 hours in a flow of air and 10% of steam.

Example 4

This example represents another downstream TWC-2 catalyst which has the same composition as that of EXAMPLE 3, except that 18.2 wt. % of palladium in the bottom coat was replaced with the same amount of platinum. The catalyst was aged at 850° C. for 10 hours in a flow of air and 10% of steam. This example contains the addition of platinum to improve HC light-off and steam reforming.

Example 5 (Comparative)

For comparison, an emission-control catalyst system was formed by preparing, in accordance with methods set forth herein, a TWC-1 catalyst in accordance with Example 2 in a close-coupled position, and a TWC-2 catalyst in accordance with Example 3 in an underfloor position.

Example 6

An inventive emission-control catalyst system was formed by preparing, in accordance with methods set forth herein and with FIG. 1, System 1A, a TWC-1 catalyst in accordance with Example 2 in a close-coupled position, and a SCR-HCT catalyst in accordance with Example 1 followed by a TWC-2 catalyst in accordance with Example 3 in an underfloor position.

Example 7

An emission-control catalyst system was formed by preparing, in accordance with methods set forth herein and with FIG. 1, System 1A, a TWC-1 catalyst in accordance with Example 2 in a close-coupled position, and a SCR-HCT catalyst in accordance with Example 1 followed by a TWC-2 catalyst in accordance with Example 4 in an underfloor position.

Example 8 (Testing)

The systems of Comparative Example 5 and Examples 6 and 7 were tested on a lab reactor capable of simulating an FTP-72 drive cycle. All the tested catalysts were cylinder-shaped cores drilled from the corresponding full size monolith catalysts. The dimension of the core catalysts was 1 inch in diameter and 1.5 inches in length.

Figure 6:
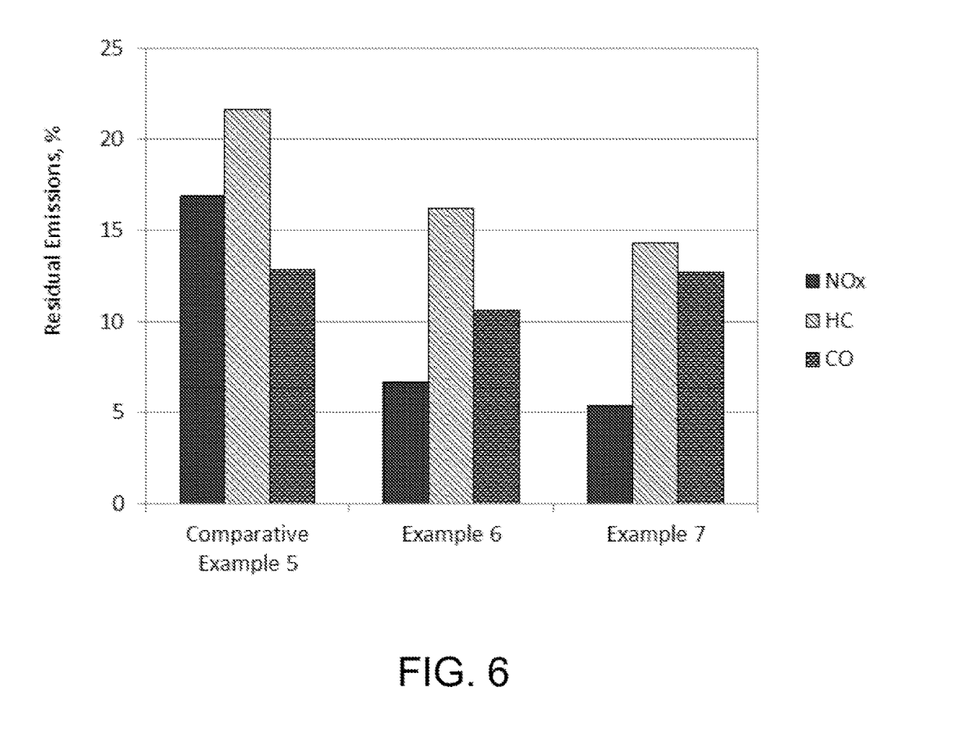
FIG. 6 is a graph showing NOx, HC and CO performance in a reactor-simulated FTP-72 drive cycle.
Figure 7:
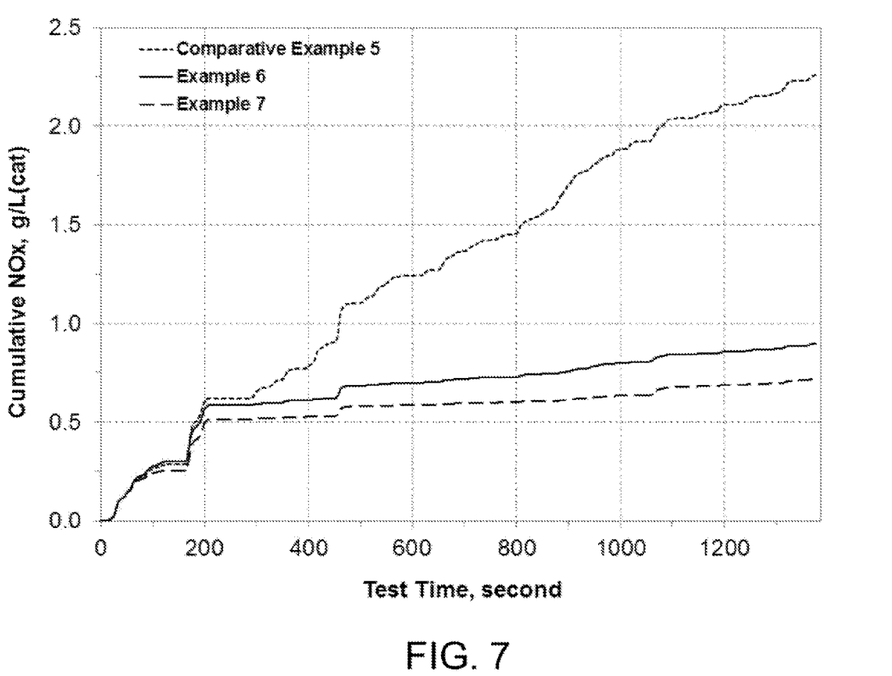
FIG. 7 is a graph showing a cumulative NOx profile.
Figure 8:
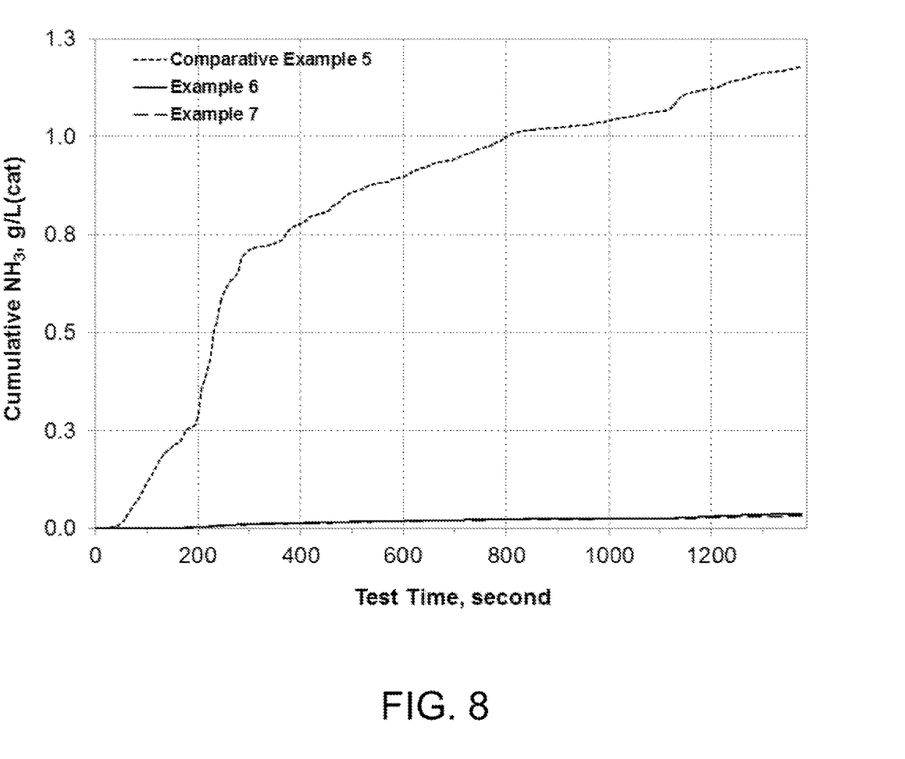
FIG. 8 is a graph showing a cumulative ammonia ($NH_3$) profile.
Figure 9:
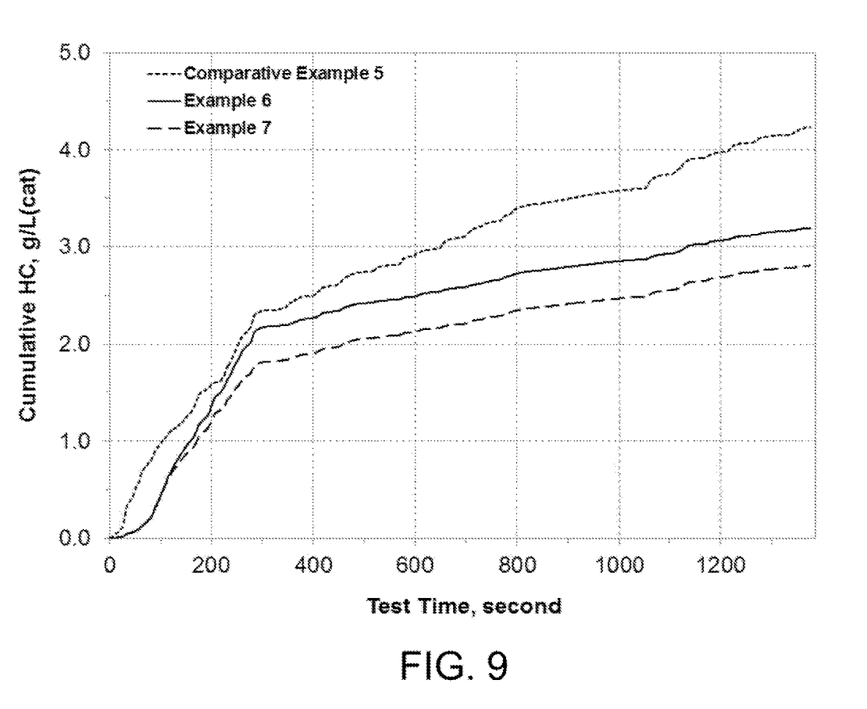
FIG. 9 is a graph showing a cumulative HC profile.

The testing results of the residual NOx, HC and CO emissions are summarized in FIG. 6. In comparison with Comparative Example 5, the invention system Example 6 converted an additional 10.2% NOx and 5.4% HC. The NOx benefit is understood to result from the passive $NH_3$—SCR reaction occurring within the SCR-HCT catalyst, as both tailpipe NOx and $NH_3$ decreased in a correlated pattern, as shown in FIG. 7 and FIG. 8. The HC benefit was partially from the cold start and partially from the hot stage. As shown in FIG. 9, the HC trapping effect of the SCR-HCT catalyst was evidenced by the delay of HC release during cold start. The effect of underfloor TWC-2 on the system performance was also studied. For instance, Example 7 used a Pt-containing TWC-2 catalyst, which further improved HC by 2% in reference to Example 6 in the cold start region.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed:

1. An emissions treatment system for an exhaust stream of an internal combustion engine, the exhaust stream comprising hydrocarbons, carbon monoxide, and nitrogen oxides, comprising: an exhaust conduit in fluid communication with the internal combustion engine via an exhaust manifold; a first three-way conversion catalyst (TWC-1) located downstream of the internal combustion engine in the exhaust conduit; an SCR-HCT catalyst comprising a selective catalytic reduction (SCR) catalyst and a hydrocarbon trap (HCT) downstream of the TWC-1 in the exhaust conduit; and a third catalyst downstream of the SCR-HCT catalyst in the exhaust conduit, the third catalyst comprising a platinum group metal (PGM).

2. The emissions treatment system of claim 1, wherein the SCR-HCT catalyst comprises an SCR catalytic material that comprises a first molecular sieve and an HCT material that comprises a second molecular sieve that is different from the first molecular sieve, wherein both the SCR catalytic material and the HCT material are deposited on a monolithic substrate.

3. The emissions treatment system of claim 2, wherein the first molecular sieve comprises a Cu-CHA zeolite and the second molecular sieve comprises a Beta zeolite.

4. The emissions treatment system of claim 2, wherein the SCR catalytic material and the HCT material are present in a weight ratio of 10:1 to 1:10.

5. The emissions treatment system of claim 2, wherein the monolithic substrate is a flow-through substrate or a wall-flow filter.

6. The emissions treatment system of claim 2, wherein the first molecular sieve comprises an 8-member ring small pore zeolite containing a metal promoter and the second molecular sieve comprises a 10-member ring medium pore or a 12-member ring large pore zeolite.

7. The emissions treatment system of claim 6, wherein the 10-member ring medium pore or 12-member ring large pore zeolite comprises a metal promoter.

8. The emissions treatment system of claim 6, wherein the 8-member ring zeolite is ion-exchanged with one or more of copper and iron, having a CHA, SAPO, or AEI structure.

9. The emissions treatment system of claim 7, wherein the 10- or 12-member ring zeolite has a structure type of ZSM-5, Beta, or MFI in an $H^+$, $NH^{4+}$, Cu-exchanged, or Fe-exchanged form.

10. The emissions treatment system of claim 2, wherein the HCT material and the SCR catalytic material are in a homogenously mixed layer on the monolithic substrate.

11. The emissions treatment system of claim 2, wherein the HCT material and the SCR catalytic material are in a layered configuration on the monolithic substrate.

12. The emissions treatment system of claim 2, wherein the HCT material and the SCR catalytic material are in a zoned configuration on the monolithic substrate.

13. The emissions treatment system of claim 1, wherein the third catalyst is selected from the group consisting of a second three-way conversion (TWC-2) catalyst, an oxidation catalyst (OC), and a lean NOx trap (LNT).

14. The emissions treatment system of claim 1, wherein the third catalyst is heated by an external source.

15. The emissions treatment system of claim 1, wherein both the TWC-1 and the third catalyst comprise carriers and wherein the carrier for the third catalyst has a smaller thermal mass relative to the carrier for the TWC-1.

16. The emissions treatment system of claim 1, wherein the TWC-1 is located in a close-coupled position; and the SCR-HCT catalyst and the third catalyst are located in an underfloor position.

17. The emissions treatment system of claim 1, wherein the TWC-1, the SCR-HCT catalyst, and the third catalyst are all located in one module.

18. The emissions treatment system of claim 1, wherein the SCR-HCT catalyst and the third catalyst are both located in one module.

19. The emissions treatment system of claim 1, further comprising an air supply upstream of the SCR-HCT catalyst.

20. The emissions treatment system of claim 1, comprising: an exhaust conduit in fluid communication with the internal combustion engine via an exhaust manifold; a first three-way conversion catalyst (TWC-1) located downstream of the internal combustion engine in the exhaust conduit; an SCR-HCT catalyst comprising a selective catalytic reduction (SCR) catalyst and a hydrocarbon trap (HCT) downstream of the TWC-1 in the exhaust conduit, the SCR catalyst comprising a first molecular sieve and the HCT catalyst comprising a second molecular sieve that is different from the first molecular sieve; and a second three-way conversion catalyst (TWC-2) downstream of the SCR-HCT catalyst in the exhaust conduit, the TWC-2 comprising a platinum group metal (PGM) and an oxygen storage component.

21. The emissions treatment system of claim 20, wherein the first molecular sieve comprises an 8-member ring zeolite having a CHA, SAPO, or AEI structure that is ion-exchanged with copper or iron and the second molecular sieve comprises a 10- or 12-member ring zeolite having a ZSM-5, Beta, or MFI structure in a $H^+$, $NH^{4+}$, Cu-exchanged, or Fe-exchanged form, wherein the 10- or 12-member ring zeolite is optionally ion-exchanged, and wherein the HCT and the SCR catalyst are in a layered configuration on a monolithic substrate.

22. The emissions treatment system of claim 20, wherein the first molecular sieve comprises a Cu-CHA zeolite and the second molecular sieve comprises a Beta zeolite.

23. A method for treating exhaust gases, comprising contacting a gaseous stream comprising hydrocarbons (HCs), carbon monoxide (CO), and nitrogen oxides (NOx) with the emissions treatment system according to claim 1.

24. The method of claim 23, wherein: upon contact with the TWC-1, hydrocarbons, carbon monoxide, and nitrogen oxides are substantially simultaneously converted and ammonia is generated; upon contact with the SCR-HCT catalyst, ammonia is stored in the SCR catalyst and used for reduction of breakthrough NOx, and hydrocarbons are trapped in the HCT during cold start and released at higher temperatures; and upon contact with the third catalyst, hydrocarbons released from the HCT are lit-off.

25. A method of making an emissions treatment system, the method comprising: providing a first three-way conversion (TWC-1) catalyst located downstream of an internal combustion engine in an exhaust conduit; locating an SCR-HCT catalyst comprising a selective catalytic reduction (SCR) catalyst and a hydrocarbon trap (HCT) downstream of the TWC-1 in the exhaust conduit; and locating a third catalyst downstream of the SCR-HCT catalyst in the exhaust conduit, the third catalyst comprising a platinum group metal (PGM).

* * * * *